United States Patent
Wagner

(10) Patent No.: US 11,616,672 B2
(45) Date of Patent: Mar. 28, 2023

(54) CYCLIC SHIFT DETERMINATION FOR SIDELINK FEEDBACK

(71) Applicant: TCL Communication Limited, Hong Kong (CN)

(72) Inventor: Sebastian Wagner, Nanterre (FR)

(73) Assignee: TCL Communication Limited, Hong Kong (CN)

( * ) Notice: Subject to any disclaimer, the term of this patent is extended or adjusted under 35 U.S.C. 154(b) by 0 days.

(21) Appl. No.: 17/088,487

(22) Filed: Nov. 3, 2020

(65) Prior Publication Data

US 2021/0250214 A1    Aug. 12, 2021

Related U.S. Application Data

(60) Provisional application No. 62/971,837, filed on Feb. 7, 2020.

(51) Int. Cl.
| | | |
|---|---|---|
| H04L 1/18 | (2006.01) | |
| H04L 27/26 | (2006.01) | |
| H04W 72/02 | (2009.01) | |
| H04L 1/1812 | (2023.01) | |
| H04W 92/18 | (2009.01) | |

(52) U.S. Cl.
CPC ........ *H04L 27/2607* (2013.01); *H04L 1/1819* (2013.01); *H04W 72/02* (2013.01); *H04W 92/18* (2013.01)

(58) Field of Classification Search
CPC . H04L 1/1819; H04L 1/1861; H04L 27/2607; H04L 5/0055; H04L 2001/0092; H04L 5/0007; H04W 72/02; H04W 92/18
See application file for complete search history.

(56) References Cited

U.S. PATENT DOCUMENTS

| | | | |
|---|---|---|---|
| 2019/0349895 A1 | 11/2019 | Liu et al. | |
| 2020/0029318 A1* | 1/2020 | Guo | .................. H04W 72/042 |
| 2020/0288286 A1* | 9/2020 | Hwang | ................. H04L 1/1614 |

FOREIGN PATENT DOCUMENTS

CN        110545533 A     12/2019

OTHER PUBLICATIONS

LG Electronics: ("Summary of RAN 1 Agreements/Working assumptions in WI 5G V2X with NR sidelink"; 3GPP Draft; R1-1913601; Reno, USA, Jan. 2020 (Year: 2020).*
LG Electronics ("Feature lead summary #3 for AI 7.2.4.5 Physical layer procedures for sidelink"; R1-1913572; 3GPP TSG RAN WG1 #99; Reno, USA, Nov. 18-22, 2019 (Year: 2019).*
"Summary of RAN1 Agreements/Working assumptions in WI 5G V2X with NR sidelink", LG Electronics, 3GPP TSG RAN WG1 #99, R1-1913601, Nov. 18, 2019.
"Discussion on physical layer procedures for NR sidelink", LG Electronics, 3GPP TSG RAN WG1 Meeting #99, R1-1913237, 2019.

(Continued)

*Primary Examiner* — Melvin C Marcelo
*Assistant Examiner* — Natali Pascual Peguero
(74) *Attorney, Agent, or Firm* — PV IP PC; Wei Te Chung; Ude Lu

(57) ABSTRACT

A method for calculating cyclic shifts for sequences used in Physical Sidelink Feedback Channel (PSFCH) transmissions is provided. The cyclic shift may be based on a PSFCH resource index, an initial cyclic shift, and the number of cyclic shift pairs which are available.

15 Claims, 4 Drawing Sheets

(56) References Cited

OTHER PUBLICATIONS

"Feature lead summary #3 for AI 7.2.4.5 Physical layer procedures for sidelink", LG Electronics, 3GPP TSG RAN WG1 #99, R1-1913572, 2019.
Physical layer procedures for control (Release 16), 3GPP TS 38.213 v16.0.0.14, 3rd Generation Partnership Project, Technical Specification Group Radio Access Network, NR, 2019.
Technical Specification 3rd Generation Partnership Project, Technical Specification Group Radio Access Network, NR, Physical channels and modulation (Release 16), 3GPP TS 38.211 V16.0.0, 2019.

* cited by examiner

CYCLIC SHIFT DETERMINATION FOR SIDELINK FEEDBACK

CROSS-REFERENCE TO RELATED APPLICATION

This application claims priority to U.S. provisional patent application No. 62/971,837, filed Feb. 7, 2020, the content of which is incorporated herein by reference in its entirety.

FIELD OF THE INVENTION

The following disclosure relates to determining the cyclic shift for Sidelink feedback signalling.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

NR has added a lot of capabilities and technical features to the wireless strategies going way beyond LTE for operation on licensed spectrum. In addition, the NR protocols are intended to offer options for operating in unlicensed radio bands, to be known as NR-U. When operating in an unlicensed radio band the gNB and UE must compete with other devices for physical medium/resource access. For example, Wi-Fi, NR-U, and LAA may utilise the same physical resources.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of $10^{-5}$ or $10^{-6}$ has been proposed.

mMTC services are intended to support a large number of devices over a long life-time with highly energy efficient communication channels, where transmission of data to and from each device occurs sporadically and infrequently. For example, a cell may be expected to support many thousands of devices.

The disclosure below relates to various improvements to cellular wireless communications systems.

SUMMARY OF THE INVENTION

There is provided a method for determination of an initial cyclic shift for Physical Sidelink Feedback Channel (PSFCH) sequence generation, the method comprising the steps of calculating a PSFCH resource index to determine the PSFCH candidate resource for transmission of a PSFCH among a PSFCH candidate resource set of size equal to the number of physical resource blocks available for PSFCH transmission multiplied by the number of cyclic shift pairs, calculating the cyclic shift index corresponding to the PSFCH resource index, and determining the initial cyclic shift for the PSFCH sequence from the cyclic shift index and the number of cyclic shift pairs based on a predefined table.

The number of cyclic shift pairs may be pre-configured per resource pool among {1; 2; 3; 4; 6}.

Calculating the cyclic shift index in the code domain may be calculated according to $$c = \left\lfloor \frac{p}{z} \right\rfloor$$

where $\lfloor . \rfloor$ represents a floor operation, where p is the PSFCH resource index, and Z is the number of physical resource blocks available for PSFCH transmission.

The PSFCH resource index may be calculated as p=(K+M) mod (ZY), where Y is the number of cyclic shift pairs, K is the L1-source ID, and M is the member ID.

The method may further comprise the step of generating the PSFCH sequence depending on the calculated parameters.

The initial cyclic shift may be further dependent on the group size for a groupcast communication.

The method may further comprise receiving the determined PSFCH sequence transmitted by another UE.

The PSFCH sequence may represent HARQ feedback.

There is also provided a UE configured to perform the methods described herein.

The UE may be configured to transmit the determined PSFCH sequence.

The UE may be configured to receive the determined PSFCH sequence.

There is also provided a UE configured to receive a PSFCH sequence determined according to the methods described herein.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Those skilled in the art will recognise and appreciate that the specifics of the examples described are merely illustrative of some embodiments and that the teachings set forth herein are applicable in a variety of alternative settings.

Figure 1:
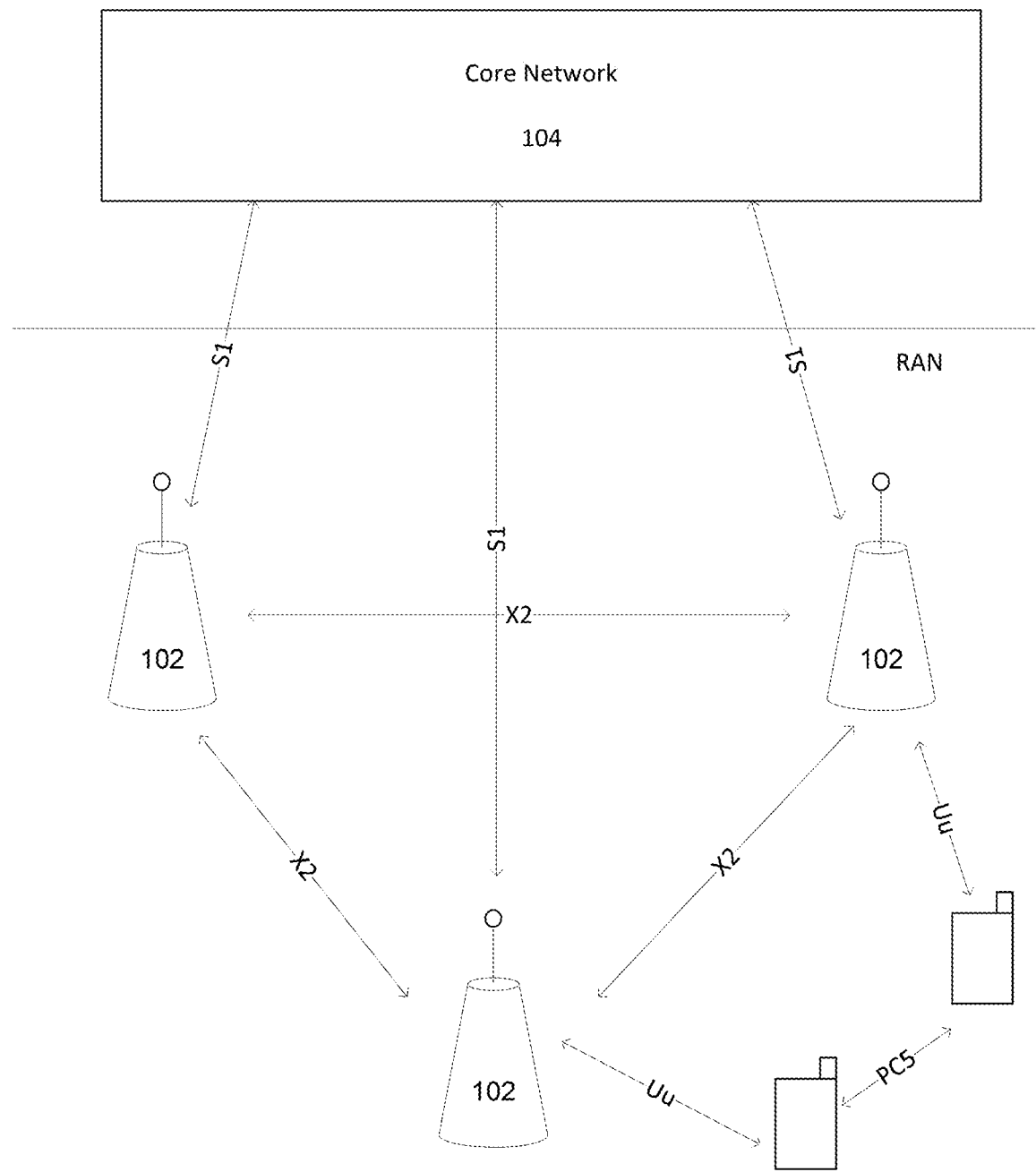
FIG. 1 shows selected elements of a cellular wireless communication network.

FIG. 1 shows a schematic diagram of three base stations 102 (for example, eNB or gNBs depending on the particular cellular standard and terminology) forming a cellular network. Typically, each of the base stations 102 will be deployed by one cellular network operator to provide geographic coverage for UEs in the area. The base stations form a Radio Area Network (RAN). Each base station 102 provides wireless coverage for UEs in its area or cell. The base stations 102 are interconnected via the X2 interface and are connected to a core network 104 via the S1 interface. As will be appreciated only basic details are shown for the purposes of exemplifying the key features of a cellular network. The interface and component names mentioned in relation to FIG. 1 are used for example only and different systems, operating to the same principles, may use different nomenclature.

The base stations 102 each comprise hardware and software to implement the RAN's functionality, including communications with the core network 104 and other base stations 102, carriage of control and data signals between the core network and UEs, and maintaining wireless communications with UEs associated with each base station. The core network 104 comprises hardware and software to implement the network functionality, such as overall network management and control, and routing of calls and data.

In vehicle-to-vehicle (V2V) applications, the UEs may be incorporated into vehicles such as cars, trucks and buses. These vehicular UEs are capable of communicating with each other in in-coverage mode, where a base station manages and allocates the resources and in out-of-coverage mode, without any base station managing and allocating the resources. In vehicle-to-everything (V2X) applications, the vehicles may be communicating not only with other vehicles, but also with infrastructure, pedestrians, cellular networks and potentially other surrounding devices. V2X use cases include:

1) Vehicles Platooning—this enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.
2) Extended Sensors—this enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.
3) Advanced Driving—this enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.
4) Remote Driving—this enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 2:
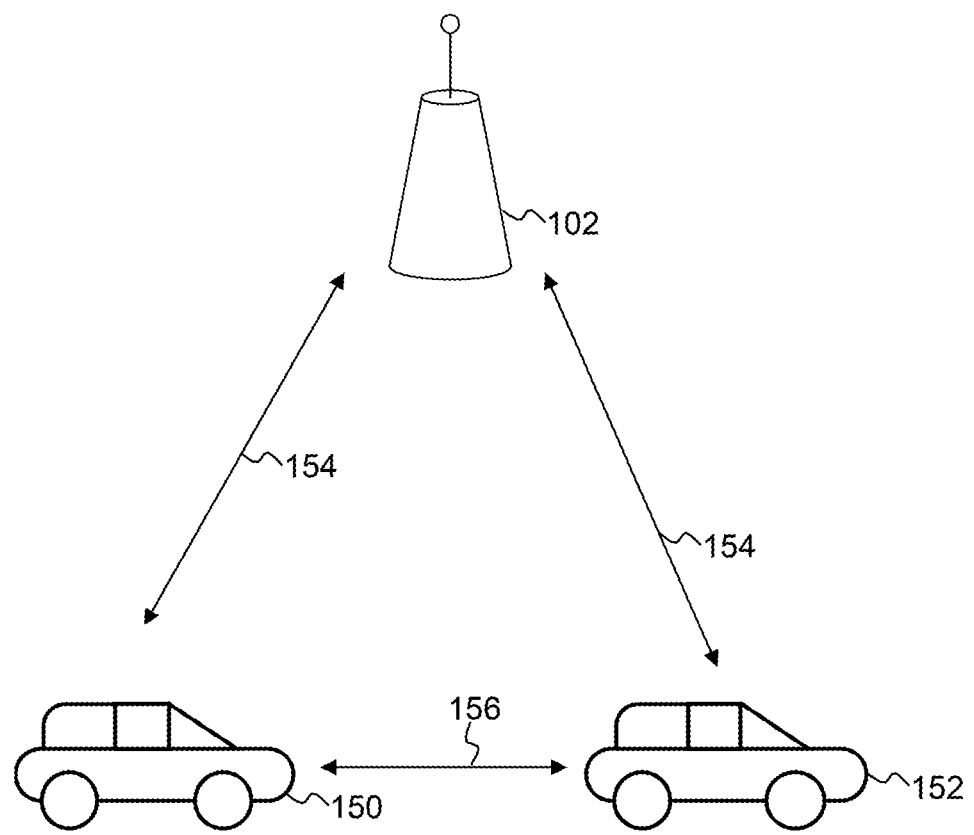
FIG. 2 shows selected elements in a Radio Area Network of the cellular wireless communication network of FIG. 1.

FIG. 2 illustrates a base station 102 forming a RAN, and a sidelink transmitter (SL Tx UE) UE 150 and a sidelink receiver (SL Rx UE) UE 152 in the RAN. UEs 150 and 152 are described as transmitter and receiver only for the purposes of explanation during a particular communication, and their roles may equally be reversed. The base station 102 is arranged to wirelessly communicate over respective connections 154 with each of the SL Tx UE 150 and the SL Rx UE 152. The SL Tx UE 150 and the SL Rx UE 152 are arranged to wirelessly communicate with each other over a sidelink 156.

Sidelink transmissions utilise TDD (half duplex) on either a dedicated carrier, or a shared carrier with conventional Uu transmissions between a base station and UE. Resource pools of transmission resources are utilised to manage resource and allocation and manage interference between potentially concurrent transmissions. A resource pool is a set of time-frequency resources from which resources for a transmission can be selected. UEs can be configured with multiple transmit and receive resource pools.

Two modes of operation are used for resource allocation for sidelink communication depending on whether the UEs are within coverage of a cellular network. In Mode 1, the V2X communication is operating in-coverage of the base stations (eg eNBs or gNBs). All the scheduling and the resource assignments may be made by the base stations.

Mode 2 applies when the V2X services operate out-of-coverage of cellular base stations. Here the UEs need to schedule themselves. For fair utilization, sensing-based resource allocation is generally adopted at the UEs. In Mode 2, UEs reserve resources for a transmission by transmitting a Sidelink Control Information (SCI) message indicating the resources to be used. The SCI notifies the recipient (which may be a single UE in unicast, a group of UEs in groupcast, or all reachable UEs in broadcast) of the details of the transmission it can expect.

HARQ ACK/NACK feedback may be implemented for sidelink transmissions using a Physical Sidelink Feedback Channel (PSFCH). For groupcast transmissions the HARQ feedback may be NACK only, or ACK/NACK. The feedback option is selected by the AS layer and signalled to UEs using the SCI message. Groups of UEs are managed by higher layers and it therefore depends on what group information is available to the UEs which feedback option can be utilised in each situation. In particular, it is anticipated that the group size and member IDs will be needed by the application layer for each UE in a group in order to be able to implement ACK/NACK feedback for groupcast transmissions in that group. The following agreement has been made regarding selection of candidate transmission resources for ACK/NACK feedback.

In determining PSFCH candidate resources for a PSFCH format from the starting sub-channel index and the slot index used for the corresponding PSSCH for actual transmission, Notation S: the number of sub-channels in a slot N: the number of PSSCH slots associated with a single PSFCH slot $N_F$: the number of PRBs in the set (pre-)configured for the actual PSFCH resources.

Within the set of PRBs (pre-)configured for the actual PSFCH resources, the first Z PRBs are associated with the first sub-channel in the first slot associated with the PSFCH slot, the second Z PRBs are associated with the first sub-channel in the second slot associated with the PSFCH slot, and so on.

Behaviour when $N_F$ is not a multiple of S*N is to be decided

For a PSSCH, the candidate PSFCH resource is the set of PRBs associated with

Option 1: the starting sub-channel and slot used for that PSSCH.

Option 2: the sub-channel(s) and slot used for that PSSCH PSFCH TX/TX conflict case 2 and 3 will be discussed separately.

This determines the association of Z PRBs within the PSFCH resources to a PSSCH transmission. T following assumptions are used to determine the PSFCH resources within the Z PRBs:—

For the PSFCH candidate resource set with Z PRBs and Y cyclic shift pairs in each PRB, Each PSFCH resource is indexed in the manner of frequency first and cyclic shift second.

The order of cyclic shift indexing in a PRB is to be decided.

PSFCH resource with the index $((K+M) \mod (Z*Y))$ is used for PSFCH transmission of a RX UE.

K is the L1 source ID of the associated PSCCH/PSSCH.

M is 0 for unicast and groupcast feedback option 1 and M is the member ID of the RX UE for groupcast feedback option 2.

It is to be decided whether Groupcast HARQ feedback option 2 is not used if X>Z*Y (Y denotes the number of PSFCH in a PRB).

It is assumed that the member ID M is an integer between 0 and X−1.

The sub-channel size of a resource pool is agreed to be Support {10; 15; 20; 25; 50; 75; 100} PRBs for possible sub-channel size, with other values to be considered.

One value of the above set is (pre)configured for the sub-channel size for the resource pool.

Size of PSCCH: X

X<=N, where N is the number of PRBs of the sub-channel

X is (pre)-configurable with values to be decided

The number of cyclic shift pairs used for a PSFCH transmission (denoted by Y) that can be multiplexed in a PRB is (pre-)configured per resource pool among {1; 2; 3; 4; 6}.

Figure 3:
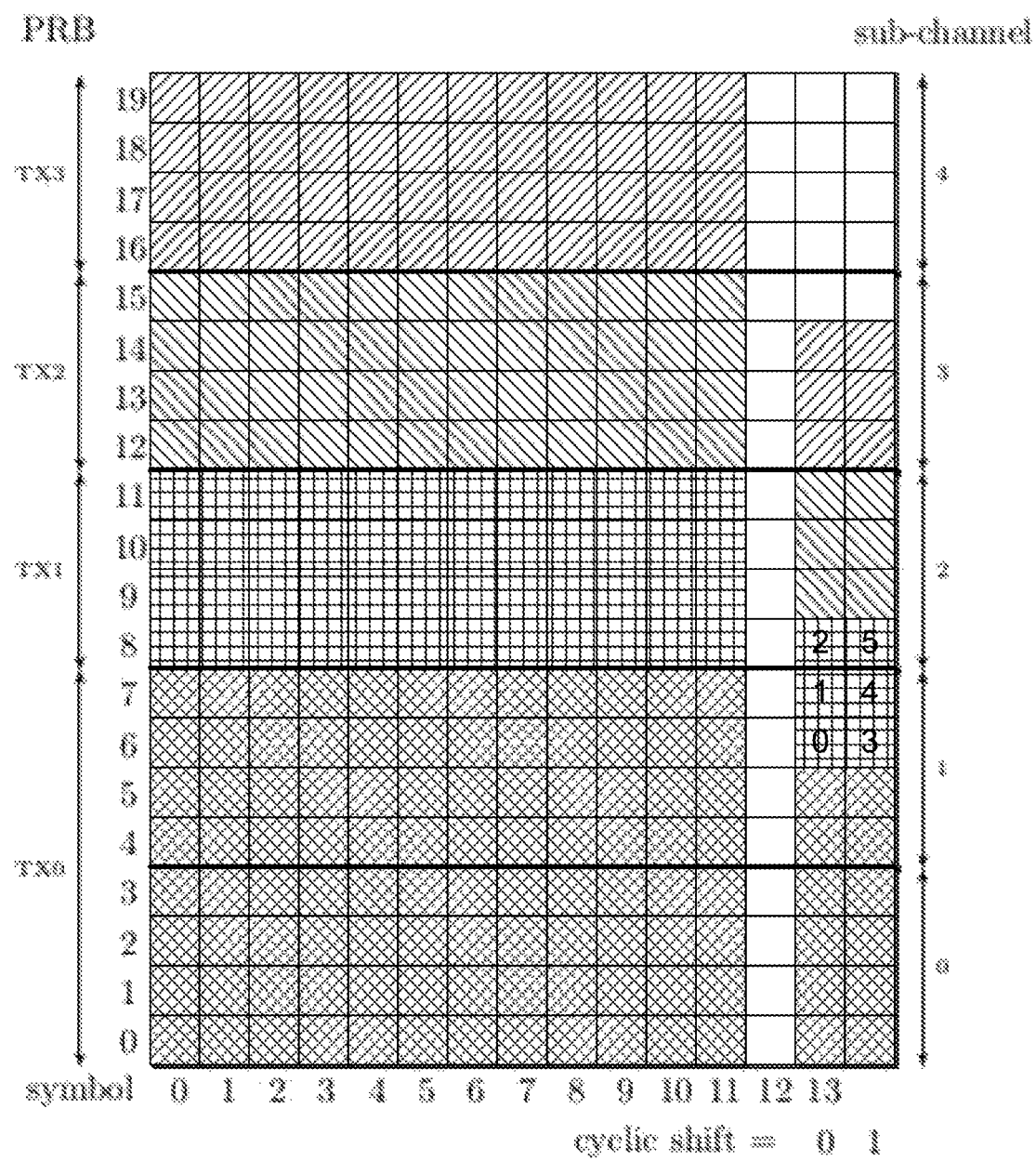
FIG. 3 shows an example of the PSFCH allocation.

FIG. 3 shows an example of the PSFCH allocation in alignment with the above rules. FIG. 3 represents a resource pool in which every slot contains PSFCH with 5 subchannels each consisting of 4 PRBs, Z=3 PRBs and Y=2 cyclic shift pairs, therefore Z*Y=6 PSFCH candidate resources per sub-channel. Transmission 0 (TX0) uses 2 sub-channels and has thus 12 associated PSFCH resource candidates. If TX0 is a unicast transmission, then only 1 PSFCH resource out of the 12 candidate resources is required and is determined based on the L1-source ID K as $((K+0) \mod (Z*Y))=(K \mod 12)$ to randomize interference between different overlapping transmissions. The L1-source ID is carried in the 2nd-stage SCI such that in order to determine the exact PSFCH location within the PSFCH candidate resources, the UE has to decode the 2nd-stage SCI.

In this example it is assumed that TX1 is a groupcast transmission with ACK/NACK feedback. Therefore, the PSFCH resource with the index $((K+M) \mod (Z*Y))$ is used for transmission by RX-UE with member ID M={0, 1, . . . , X−1}, where X is the size of the group. Under the assumption that K=0, the PSFCH resource for each RX-UE is determined as shown in FIG. 3.

The PSFCH feedback message is intended to use PUCCH Format 0 with a 1 bit payload, with a cyclic shift defined in accordance with TS 38.211. The initial cyclic shift $m_0$ is provided by the higher layer parameter initialCyclicShift (=0, 1, . . . , 11) in the PUCCH-format0 information element.

Since it has been agreed that the PSFCH resource shall be determined implicitly, signalling (like in PUCCH) of $m_0$ is not desirable. Moreover, there can only be a maximum of Y=6 cyclic shift pairs/UEs multiplexed in one PRB, because the sequence is of length $N^{RB}_{SC}=12$. Cyclic shifts $m_0=>6$ result in the same sequence pairs as $m_0<6$ but with ACK and NACK inverted. That is, an initial cyclic shift $m_0$ and $m_0+6$ cannot be used together in a PSFCH resource since it will lead to ambiguous detection, i.e. the same sequence represents a NACK of one UE and an ACK of another UE.

Figure 4:
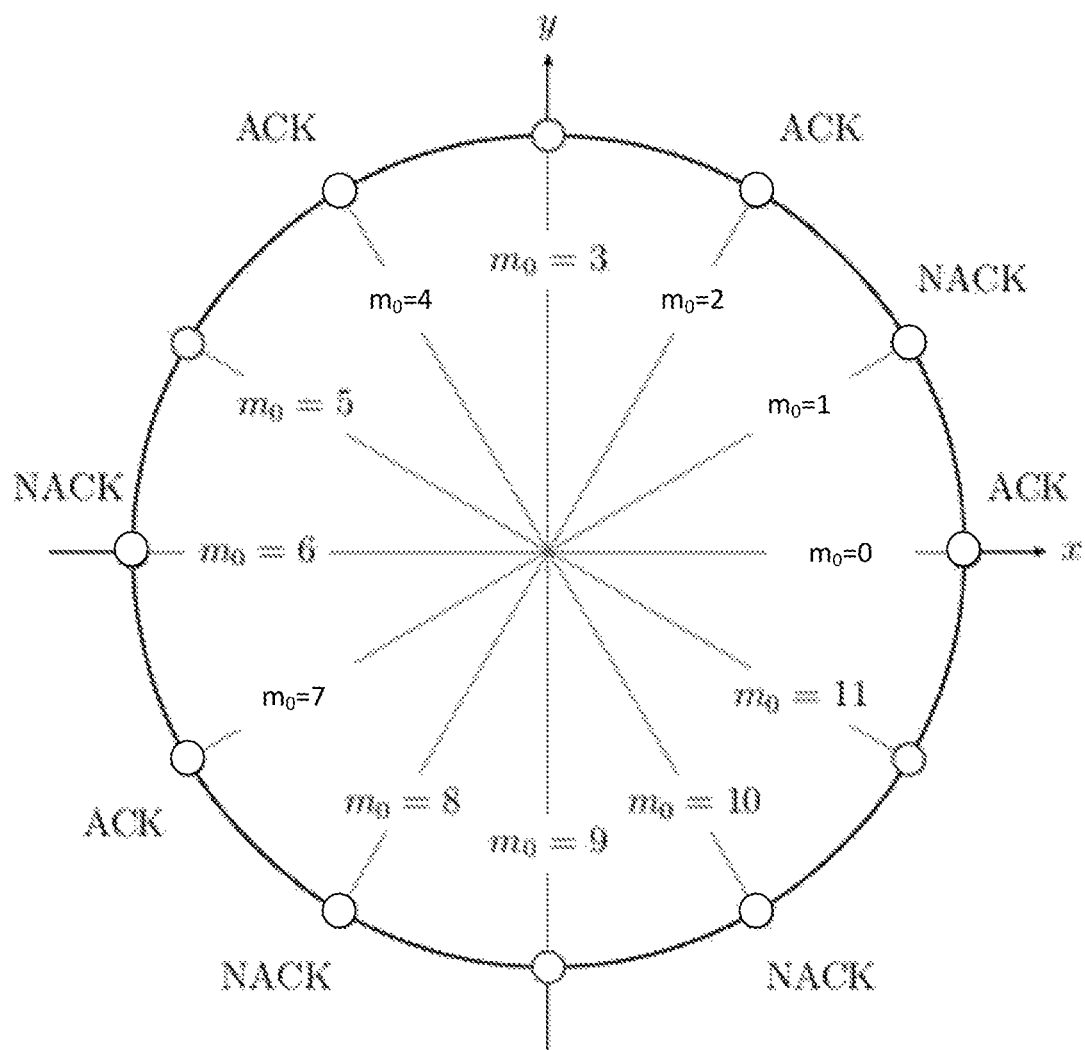
FIG. 4 shows an example of the association of initial cyclic shifts and PSFCH payload.

FIG. 4 shows an example of the association of initial cyclic shifts and PSFCH payload.

Since Y is fixed, $m_0$ must be defined to configure the PSFCH resources. A method is thus required to assign the cyclic shift $m_0(p)$ for each PSFCH resource candidate p in a PSFCH resource candidate set. Table 1 shows an example of a PSFCH candidate resource set with Z=5 and Y=3. The rows represent the logical PRB index z={1, 2, . . . , Z−1} in the frequency-domain and the columns are the code-domain c=0, 1, 2, . . . , Y−1.

The logical PRB index z={0, 1, Z−1} is an index to the subset of PRBs that may be utilised for transmission of PSFCH. In an example, a resource pool may consist of 50 PRBs with a physical index 0 to 49. Of those, only every other (i.e. the even physical indexes) may be utilised for PSFCH transmission. This, the logical PRB index z={0, 1, 2, . . . , 24} which relates to physical PRB indexes {0, 2, 4, . . . , 48}.

TABLE 1

|   | 0 | 1 | 2 |
|---|---|---|---|
| 4 | 4 | 9 | 14 |
| 3 | 3 | 8 | 13 |
| 2 | 2 | 7 | 12 |
| 1 | 1 | 6 | 11 |
| 0 | 0 | 5 | 10 |

Table 1 shows that there are ZY=5. 3=15 PSFCH resource candidates indexed from p={0, 1, . . . 14} in the frequency-first manner (Z being the number of PRBs available for PSFCH transmission). That is, every PSFCH resource is described by a PRB in the frequency domain and a cyclic shift ($m_0$) in the code domain. In general, a UE has to compute a PSFCH resource index p to determine the PSFCH candidate resource for transmission of a PSFCH among a PSFCH candidate resource set of size ZY. It is assumed that the PSFCH resource index for transmission p={0, 1, ..., ZY−1} is determined as p=(K+M) mod (ZY), where K={0, 1, ..., 255} is the 8-bit L1-source ID, M={0, 1, ..., X−1} is the member ID of the RX UE for ACK/NACK groupcast feedback (M=0 otherwise), Z is the number of PRBs for PSFCH and Y is the number of cyclic shift pairs per PRB configured in the resource pool. It is assumed that each UE operating in ACK/NACK feedback mode knows the size of the group X as well as its member ID M.

One solution to identify $m_0$ is to assign a fixed initial cyclic shift to each code dimension. However, this might not be optimal since in ACK/NACK feedback for groupcast, it could result in the same sequence being transmitted in multiple consecutive PRBs which can lead to interference problems.

The number of (pre-)configured cyclic shift pairs Y determines the maximum group size X for which ACK/NACK feedback is supported. However, if the group size [X/Z]<= (Y−1) not all code-dimension are necessarily utilized and the existing mapping is sub-optimal.

As an example, consider a fixed assignment of initial cyclic shifts $m_0$={0; 2; 4} for Y=3. If Z=5 and X=4 it is clear that at most two cyclic shifts are required, depending on K. However, in case only two cyclic shifts are actually utilized, $m_0$={0; 3} would perform better with respect to ACK/NACK detection at the receiver than any two values of $m_0$={0, 2, 4}.

The following disclosure therefore provides methods to determine the initial cyclic shift for PSFCH sequence generation, for example using fixed and adaptive mapping. The techniques are intended to randomize interference by transmitting different sequences on consecutive/periodic PRBs to enable better detection, and to adapt the initial cyclic shifts to the group size thus giving better cross-correlation properties and ACK/NACK detection at the receiver.

To determine which PSFCH sequence to transmit, the UE has to carry out the following steps:
1. Calculate the PSFCH resource index p=(K+M) mod (ZY),
2. Compute the index c=0, Y−1 in the code-domain according to $$c = \left\lfloor \frac{p}{z} \right\rfloor$$

where $\lfloor . \rfloor$ floor operation. (Equation 1)
3. Determine the initial cyclic shift $m_0(p)$
4. Generate PSFCH sequence depending on payload, etc.

As a first step to determine $m_0$, the UE computes the index in the code-domain $$c = \left\lfloor \frac{p}{z} \right\rfloor.$$

A scheme is to define a set of initial cyclic shifts per resource pool. An example of cyclic shift mapping $m_0(p)$ is shown in the following table where Y=3 cyclic shift pairs are configured with initial shifts $m_0$={0, 2, 4} and Z=5.

TABLE 2

| | | |
|---|---|---|
| $m_0(4) = 0$ | $m_0(9) = 2$ | $m_0(14) = 4$ |
| $m_0(3) = 0$ | $m_0(8) = 2$ | $m_0(13) = 4$ |
| $m_0(2) = 0$ | $m_0(7) = 2$ | $m_0(12) = 4$ |

TABLE 2-continued

| | | |
|---|---|---|
| $m_0(1) = 0$ | $m_0(6) = 2$ | $m_0(11) = 4$ |
| $m_0(0) = 0$ | $m_0(5) = 2$ | $m_0(10) = 4$ |

In this example the cyclic shifts per PRB follow a fixed sequence. That is, depending on Y the cyclic shift $m_0$ is predefined. There are various ways in which the fixed mapping of initial cyclic shift is configured. For example, they may be signalled as part of the resource pool configuration, either as raw values or as an index to a predefined table. Alternatively the cyclic shifts may not be signalled, but defined by specification.

The initial cyclic shifts may be signalled as part of the resource pool configuration, for example using the higher layer signalling (RRC). An example of the configuration is shown in the following table:—

TABLE 3

| Parameter | Value |
|---|---|
| sl-psfch-nrofCyclicShiftPairs | {1, 2, 3, 4, 6} |
| sl-psfch-initialCyclicShift | INTEGER (0 . . . 11) |
| sl-psfch-initialCyclicShifts | SEQUENCE (SIZE (1 . . . sl-psfch-nrofCyclicShifts)) OF sl-psfch-initialCyclicShift |

Here, sl-psfch-nrofCyclicShiftPairs is Y, sl-psfch-initialCyclicShift is $m_0$ and sl-psfch-initialCyclicShifts is the list of length Y of configured values of $m_0$. The initial cyclic shift values are thus defined as part of the resource pool configuration. In this example the actual values are transmitted, but alternatively an index to a table of configurations can be transmitted to reduce signalling overhead.

Instead of signalling the initial cyclic shifts, a table or multiple tables can be predefined. For example, the following table shows cyclic shifts $m_0$ as a function cyclic shift index c and Y, thus removing the need to signal the initial cyclic shift value since the UE can select the appropriate shift from the table.

TABLE 4

| | c | | | | | |
|---|---|---|---|---|---|---|
| Y | 0 | 1 | 2 | 3 | 4 | 5 |
| 1 | 0 | — | — | — | — | — |
| 2 | 0 | 3 | — | — | — | — |
| 3 | 0 | 2 | 4 | — | — | — |
| 4 | 0 | 2 | 4 | 5 | — | — |
| 6 | 0 | 1 | 2 | 3 | 4 | 5 |

For example, if Y=1 there is no CDM and the cyclic shift is $m_0$=0. If Y=3 we obtain the mapping in Table 2 above. $m_0$={0, 2, 4} could be fixed to maximize the distance between each cyclic shift pair. A UE calculates its resource index p according to p=(K+M) mod (ZY) and then calculates the cyclic shift $m_0(p)$ from Table 4 with the same cyclic shift per PRB per code dimension. A set of cyclic shifts may thus be stored, for example as a table, related to the PSFCH resource index and the (pre-configured) parameters Z and Y.

Multiple versions of the data in Table 4 may be stored with the relevant data set to utilise being signalled to the UE by higher layer (RRC) signalling or as part of the resource pool configuration. The table to use may also be determined implicitly by the Resource pool ID, Source/destination ID, or Zone ID/localisation. Multiple tables with cyclic shifts per Y may therefore be defined with the index of the table to utilise being signalled or determined implicitly. Furthermore, a different table for each value of Y could also be utilised, rather than the data structure shown in Table 4.

A potential disadvantage of a fixed mapping of the initial cyclic shift (such as occurs using the tables described above) is that the same signal may be transmitted on all PRBs if the group size is small relative to Z. For ACK/NACK group feedback this can create problems at the receiver (constructive or destructive interference) if the channel is not able to sufficiently randomize the transmitted signal of each UE in the group. Therefore, it can be beneficial if the sequence transmitted on each PRB (PSFCH resource) is different. This may be achieved by the following disclosure of a base table of cyclic shifts which is then utilized to determine the actual initial cyclic shift, or a formula may be defined to compute an initial cyclic shift.

The disclosure above can be used to determine a table of base cyclic shifts, but they are used as a base, not the actual values. In an example the actual cyclic shift can be calculated as $$m_0 = [\text{Table}(Y,c) + Q] \mod 12 \qquad \text{Equation 3}$$

Where Table (Y, c) is an entry in the base table described above using Y and c as indexes, and Q is a variable depending on selected parameters such as logical PRB index. A resulting table of final cyclic shifts is shown in table 5 below in which Q=z, Z=4, Y=3 and Table (Y=3, c)={0, 2,4}:—

TABLE 5

| z | c 0 | 1 | 2 |
|---|---|---|---|
| 3 | 3 | 5 | 7 |
| 2 | 2 | 4 | 6 |
| 1 | 1 | 3 | 5 |
| 0 | 0 | 2 | 4 |

This approach can be summarised in that the base table values are rotated by Q. Alternatively the initial cyclic shift can be determined directly by indexing the base table:—

$$m_0 = \text{Table}(Y, [c+Q] \mod Y) \qquad \text{Equation 4}$$

An example in which Q=z is shown in Table 6 below in which Z=4, Y=3, and Table (Y=3, I)={0, 2, 4}:

TABLE 6

| z | c 0 | 1 | 2 |
|---|---|---|---|
| 3 | 0 | 2 | 4 |
| 2 | 4 | 0 | 2 |
| 1 | 2 | 4 | 0 |
| 0 | 0 | 2 | 4 |

Using this method, the same initial cyclic shifts in a base table are used but depending on the PRB index they are cyclically shifted.

For ACK/NACK feedback for group transmission it may be possible to optimise the performance of the PSFCH detection by adapting the cyclic shifts according to the group size. As noted above, each UE in a group must be aware of member IDs and group size to operate ACK/NACK feedback, and the member ID M is 0, 1, . . . , X−1. For instance, assuming the scheme described above, with Z=5, Y=6 with $m_0=\{0, 1, 2, 3, 4, 5\}$ the first 5 group members will use $m_0=0$, the next five will use $m_0=1$, and so on. However, the group size X can change and will not always be large. Hence, if there are only 10 members it is likely to be sub-optimal to utilize initial cyclic shifts $m_0=\{0; 1\}$ since the cross-correlation of the resulting sequences is worse than for other examples such as $m_0=\{0; 3\}$. The initial cyclic shift may thus be defined dependent on group size. For example, Z=5 PRBs and Y=6 with $m_0=\{0, 1, 2, 3, 4, 5\}$ provides the mapping shown in Table 7 below.

TABLE 7

Table of cyclic shifts $m_0$ as a function of the group size X, Z = 5 PRBs and Y = 6 with $m_0$ = {0, 1, 2, 3, 4, 5}

| X | c 0 | 1 | 2 | 3 | 4 | 5 |
|---|---|---|---|---|---|---|
| 1 | 0 | — | — | — | — | — |
| 2 | 0 | — | — | — | — | — |
| 3 | 0 | — | — | — | — | — |
| 4 | 0 | — | — | — | — | — |
| 5 | 0 | — | — | — | — | — |
| 6 | 0 | 3 | — | — | — | — |
| 7 | 0 | 3 | — | — | — | — |
| 8 | 0 | 3 | — | — | — | — |
| 9 | 0 | 3 | — | — | — | — |
| 10 | 0 | 3 | — | — | — | — |
| 11 | 0 | 2 | 4 | — | — | — |
| 12 | 0 | 2 | 4 | — | — | — |
| 13 | 0 | 2 | 4 | — | — | — |
| 14 | 0 | 2 | 4 | — | — | — |
| 15 | 0 | 2 | 4 | — | — | — |
| 16 | 0 | 2 | 4 | 1 | — | — |
| 17 | 0 | 2 | 4 | 1 | — | — |
| 18 | 0 | 2 | 4 | 1 | — | — |
| 19 | 0 | 2 | 4 | 1 | — | — |
| 20 | 0 | 2 | 4 | 1 | — | — |
| 21 | 0 | 2 | 4 | 1 | 3 | — |
| 22 | 0 | 2 | 4 | 1 | 3 | — |
| 23 | 0 | 2 | 4 | 1 | 3 | — |
| 24 | 0 | 2 | 4 | 1 | 3 | — |
| 25 | 0 | 2 | 4 | 1 | 3 | — |
| 26 | 0 | 2 | 4 | 1 | 3 | 5 |
| 27 | 0 | 2 | 4 | 1 | 3 | 5 |
| 28 | 0 | 2 | 4 | 1 | 3 | 5 |
| 29 | 0 | 2 | 4 | 1 | 3 | 5 |
| 30 | 0 | 2 | 4 | 1 | 3 | 5 |

In Table 7, the initial cyclic shift depends on the group size X and Z. For example, assuming K=0, if 5<X<=10, cyclic shifts $m_0=\{0, 3\}$ are used. However, a potential issue is that PSFCH index p depends on K and M and can point anywhere in the PSFCH resource grid of Z rows and Y columns. The number of cyclic shift pairs Y is (pre-)configured per resource pool. A possible disadvantage with the proposed scheme may arise for example if K=20 but X=10. We propose only to use cyclic shifts 0 and 3 but the calculation p=(K+M) mod (ZY) results in p={20, 21, . . . , 29} which in Table 7 correspond to cyclic shifts 3 and 5. This is because in p=(K+M) mod (ZY) Y=6 and Z=5 are used but X=10 and hence only two cyclic shift pairs are sufficient, i.e. Y=2.

In a further method, Y used in p=(K+M) mod (ZY) to calculate the PSFCH resource index may be calculated as $$Y = \left\lceil \frac{X}{Z} \right\rceil$$

where [.] is the cell operation.

Once the correct Y is computed, the UEs can carry out the usual procedure and use any method described above to compute the actual initial cyclic shift values. One potential issue with this method is that some randomization with the source-ID K is lost. More precisely, the initial cyclic shifts could be for instance 0, 2, 4 depending on K. However, now they are only 0 or 3. Therefore, it may be desirable to introduce an additional randomization depending on K. This can be achieved for instance by setting Q=z+K in equations (3) and (4) above.

In another method, a possibility is to set the value K=0 when activating ACK/NACK feedback for group transmissions. A potential disadvantage is that the randomization based on the source ID K is lost. However, similar to the proposal above, K can be introduced later into formulas (3) or (4) by setting Q=z+K for example. Setting K=0 allows to define tables depending on group size X, for example Table 7 above. As explained above, this table can be used to compute the actual values for $m_0$ or serve as a base table for calculation of those final values.

As will be appreciated, the techniques described herein may be applicable to all types of sidelink transmission, and in particular to unicast, groupcast and broadcast transmissions.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', can', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method for determination of an initial cyclic shift pair for Physical Sidelink Feedback Channel (PSFCH) sequence generation, the method being executed by a user equipment (UE), and the method comprising the steps of:
   obtaining a PSFCH resource index of a PSFCH candidate resource for transmission of a PSFCH among a PSFCH candidate resource set of a size equal to a number of physical resource blocks available for PSFCH transmission multiplied by a number of cyclic shift pairs;
   obtaining an index of a cyclic shift pair corresponding to the PSFCH resource index, and
   determining the initial cyclic shift pair for generating a PSFCH sequence from the index of the cyclic shift pair and a value of the number of cyclic shift pairs based on a predefined table, wherein the predefined table comprises columns indexed by different index values of the cyclic shift pair and rows indexed by different numbers of cyclic shift pairs, the index of the cyclic shift pair indicates one index value among the different index values and the value of the number of cyclic shift pairs indicates one number among the different numbers of cyclic shift pairs, the determined initial cyclic shift pair is one of a plurality of cyclic shift pairs in the predefined table and is associated with the indicated index value and the indicated number, and each of the plurality of cyclic shift pairs in the predefined table is associated with one of the different index values and one of the different numbers of cyclic shift pairs.

2. The method according to claim 1, wherein the number of cyclic shift pairs is pre-configured per resource pool among {1; 2; 3; 4; 6}.

3. The method according to claim 1, wherein obtaining an index of a cyclic shift pair is performed according to $$c = \left\lfloor \frac{p}{Z} \right\rfloor$$

where $\lfloor . \rfloor$ represents a floor operation, where p is the PSFCH resource index, and Z is the number of physical resource blocks available for PSFCH transmission.

4. The method according to claim 1, further comprising the step of generating the PSFCH sequence depending on determined parameters.

5. The method according to claim 1, wherein the initial cyclic shift pair is further dependent on a group size for a groupcast communication.

6. The method according to claim 1, wherein Y is calculated as $$Y = \left\lceil \frac{X}{Z} \right\rceil$$

where $\lceil . \rceil$ is the cell operation, and X is the group size.

7. The method according to claim 1, further comprising receiving the PSFCH sequence transmitted by another UE.

8. The method according to claim 7, wherein the PSFCH sequence represents HARQ feedback.

9. A UE configured to perform the method of claim 1.

10. The UE according to claim 9, wherein the UE is configured to transmit the PSFCH sequence.

11. The UE according to claim 9, wherein the UE is configured to receive the PSFCH sequence.

12. The method according to claim 1, wherein each PSFCH candidate resource among a PSFCH candidate resource set is indexed in a manner of frequency first and cyclic shift second.

13. The method according to claim 1, wherein the UE receives scheduling and resource assignments of the PSFCH candidate resource set in an in-coverage mode; or
   the UE reserves the PSFCH candidate resource set by transmitting a Sidelink Control Information (SCI) message indicating the PSFCH candidate resource set to be used in an out-of-coverage mode.

14. A method for determination of an initial cyclic shift pair for Physical Sidelink Feedback Channel (PSFCH) sequence generation, the method being executed by a user equipment (UE), and the method comprising the steps of:
- obtaining an index of a cyclic shift pair corresponding to a PSFCH resource index of a PSFCH candidate resource for transmission of a PSFCH among a PSFCH candidate resource set, and
- determining the initial cyclic shift pair for generating a PSFCH sequence from the index of the cyclic shift pair and a value of a number of cyclic shift pairs based on a predefined table;
- wherein the predefined table comprises a plurality of cyclic shift pairs, each of the plurality of cyclic shift pairs in the predefined table is associated with one row index and one column index, the column index represents an index value among different index values of the cyclic shift pair, and the row index represents one number among the different numbers of cyclic shift pairs;
- wherein the determined initial cyclic shift pair is one of a plurality of cyclic shift pairs in the predefined table and is associated with a column index being equal to the index of the cyclic shift pair and a row index being equal to the value of the number of cyclic shift pairs.

15. The method according to claim 1, wherein the number of cyclic shift pairs is pre-configured per resource pool among {1; 2; 3; 4; 6}.

* * * * *